(12) United States Patent
Fujiwara et al.

(10) Patent No.: US 12,373,131 B2
(45) Date of Patent: *Jul. 29, 2025

(54) DATA SEQUENCING CIRCUIT AND METHOD

(71) Applicant: TAIWAN SEMICONDUCTOR MANUFACTURING COMPANY, LTD., Hsinchu (TW)

(72) Inventors: Hidehiro Fujiwara, Hsinchu (TW); Haruki Mori, Hsinchu (TW); Wei-Chang Zhao, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/524,587

(22) Filed: Nov. 30, 2023

(65) Prior Publication Data

US 2024/0094943 A1 Mar. 21, 2024

Related U.S. Application Data

(63) Continuation of application No. 17/729,692, filed on Apr. 26, 2022, now Pat. No. 11,853,596.

(60) Provisional application No. 63/286,324, filed on Dec. 6, 2021.

(51) Int. Cl.
*G06F 3/06* (2006.01)

(52) U.S. Cl.
CPC .......... *G06F 3/0655* (2013.01); *G06F 3/0604* (2013.01); *G06F 3/0673* (2013.01)

(58) Field of Classification Search
None
See application file for complete search history.

(56) References Cited

U.S. PATENT DOCUMENTS

| 2,907,877 | A | 10/1959 | Royce |
| 2006/0206555 | A1 | 9/2006 | Nomura et al. |
| 2012/0191967 | A1 | 7/2012 | Lin et al. |
| 2020/0174749 | A1 | 6/2020 | Kang et al. |

FOREIGN PATENT DOCUMENTS

| CA | 2287034 | 6/2000 |
| CN | 101782893 | 7/2010 |
| JP | 2009140323 | 6/2009 |
| KR | 20200018248 | 2/2020 |
| KR | 20210057158 | 6/2021 |

*Primary Examiner* — Kevin Verbrugge
(74) *Attorney, Agent, or Firm* — Hauptman Ham, LLP (57) ABSTRACT

A circuit includes a data register configured to receive and output successive data elements of a plurality of data elements responsive to a clock signal, wherein each data element of the plurality of data elements includes a total number of bits N. A signal generation portion is configured to output a first selection signal responsive to the clock signal, the first selection signal includes two alternating sequences, values of the first sequence increment from zero to N−1, and values of the second sequence decrement from N−1 to zero. A selection circuit coupled to the data register is configured to output the N bits of each data element of the plurality of data elements in a first sequential order responsive to the first sequence of the first selection signal, and in a second sequential order opposite the first sequential order responsive to the second sequence of the first selection signal.

20 Claims, 5 Drawing Sheets

DATA SEQUENCING CIRCUIT AND METHOD

PRIORITY CLAIM

The present application claims the priority of U.S. application Ser. No. 17/729,692, filed Apr. 26, 2022, now U.S. Pat. No. 11,853,596, issued Dec. 26, 2023, which claims the priority of U.S. Provisional Application No. 63/286,324, filed Dec. 6, 2021, each of which is incorporated herein by reference in its entirety.

BACKGROUND

Memory arrays are often used to store and access data used for various types of computations such as logic or mathematical operations. To perform these operations, data bits are moved between the memory arrays and circuits used to perform the computations. In some cases, computations include multiple layers of operations, and the results of a first operation are used as input data in a second operation.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In various embodiments, a data sequencing circuit is configured to transmit bits of data elements in alternating sequence order such that adjacent bits of consecutively transmitted data elements are a same one of a most significant bit (MSB) or a least significant bit (LSB). In applications, e.g., computing-in-memory (CIM) operations, in which consecutive data elements are more likely than not to have same-valued MSBs and/or LSBs, the data sequencing circuit is thereby capable of reducing signal toggling rates, and therefore power consumption, compared to approaches in which bits are not transmitted in alternating sequence order.

Figure 1:
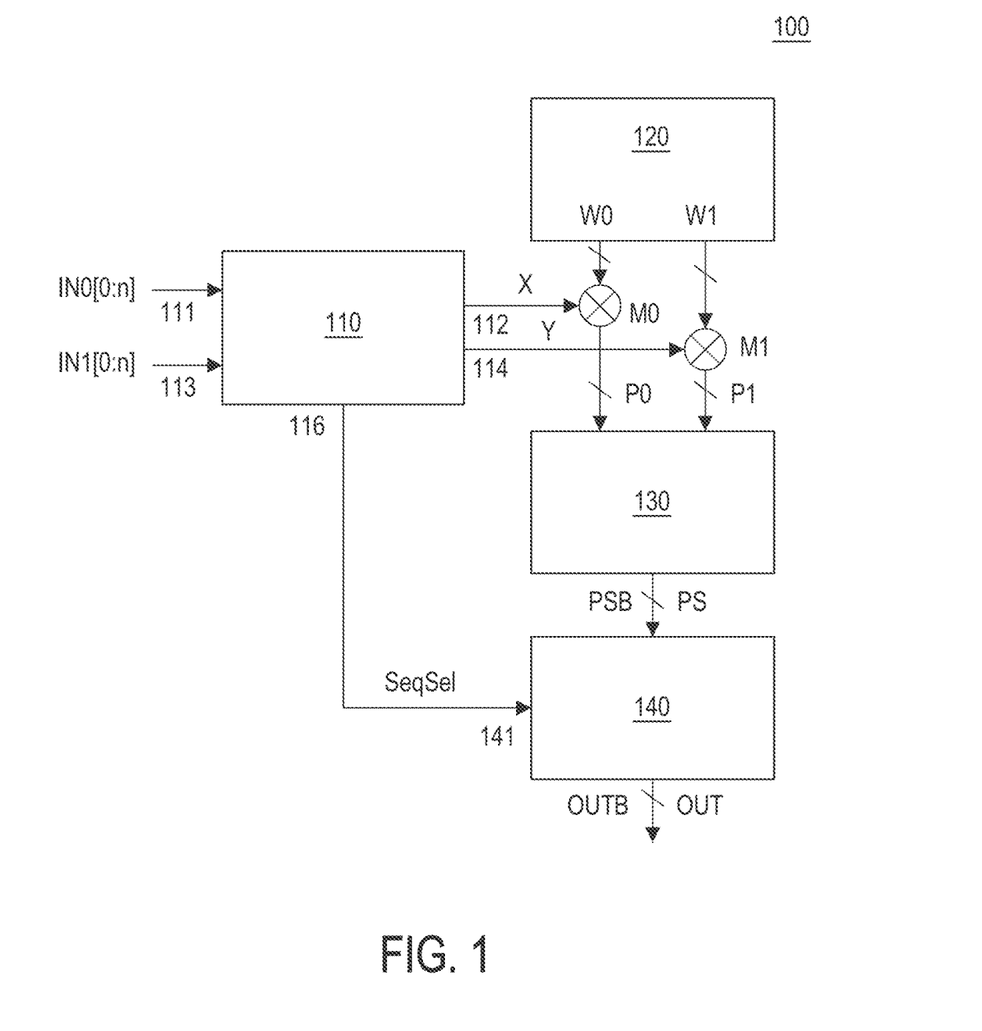
FIG. 1 is a schematic diagram of a data sequencing circuit, in accordance with some embodiments.

FIG. 1 is a schematic diagram of a data sequencing circuit 100, in accordance with some embodiments. Data sequencing circuit 100, also referred to as a circuit 100 or memory circuit 100 in some embodiments, includes an input circuit 110, a storage element 120, multipliers M0 and M1, an adder 130, an accumulator 140, and a data bus OUTB.

Input circuit 110 includes input paths 111 and 113 configured to receive respective signals IN0[0:n] and IN1[0:n], output terminals 112 and 114 coupled to multipliers M0 and M1 and configured to output signals X and Y, and an output terminal 116 coupled to an input terminal 141 of accumulator 140 and configured to output a signal SeqSel, also referred to as a selection signal SeqSel in some embodiments. Multipliers M0 and M1 are also coupled to storage element 120 and adder 130, and are thereby configured to receive respective data elements W0 and W1 from storage element 120 and output respective data elements P0 and P1 to adder 130. Adder 130 is coupled to accumulator 140 through a data bus PSB and configured to output a partial sum PS on data bus PSB. Accumulator 140 is configured to receive partial sum PS on data bus PSB and signal SeqSel at input terminal 141, and output a signal OUT on data bus OUTB.

In some embodiments, data sequencing circuit 100 does not include storage element 120, multipliers M0 and M1, adder 130, accumulator 140, and data bus OUTB, and instead includes input circuit 110 configured to output signals X and Y on output terminals 112 and 114 configured other than as depicted in FIG. 1, e.g., coupled to one or more external circuits.

Two or more circuit elements are considered to be coupled based on a direct electrical connection or an electrical connection that includes one or more additional circuit elements and is thereby capable of being controlled, e.g., made resistive or open by one or more transistors or other switching devices.

The embodiment depicted in FIG. 1 is a non-limiting example simplified for the purpose of illustration. In some embodiments, data sequencing circuit 100 includes circuit elements in addition to those depicted in FIG. 1 and discussed below, e.g., a control circuit or additional instances of the depicted circuit elements. In some embodiments, the elements depicted in FIG. 1 are a portion of a memory array including rows and columns corresponding to multiple instances of input circuit 110, storage element 120, multipliers M0 and M1, adder 130, and/or accumulator 140.

In some embodiments, data sequencing circuit 100 is a portion of a CIM circuit including elements configured to perform in-memory computations, e.g., a convolutional neural network (CNN) in which arrays include stored weight data elements, e.g., data elements W0 and W1, that are applied in multiply and accumulate (MAC) operations to one or more sets of input data elements, e.g., signals IN0[0:n] and IN1[0:n].

The relationships between circuit elements depicted in FIG. 1 are a non-limiting example provided for the purpose of illustration. In some embodiments, a total of more than two multipliers M0 and M1 corresponds to single instances of storage element 120, adder 130, and/or accumulator 140.

Each of signals IN0[0:n] and IN1[0:n], also referred to as input signals IN0[0:n] and IN1[0:n] in some embodiments, incudes a set of data elements, each data element including a predetermined total number of bits equal to n+1, as discussed below.

Input circuit 110 is an electronic circuit, e.g., an integrated circuit (IC), configured to receive one or more input signals, e.g., signals IN0[0:n] and IN1[0:n], and output the data elements of the input signals as consecutive portions of a corresponding one or more output signals, e.g., signals X and Y. As discussed below, input circuit 110 is configured to transmit the bits of the data elements in alternating sequence order such that adjacent bits of consecutively transmitted data elements are a same one of a MSB or LSB. In some embodiments, input circuit 110 includes input circuit 200 discussed below with respect to FIG. 2.

Each of input paths 111 and 113 is one or more signal paths configured to receive respective signals IN0[0:n] and IN1[0:n]. In various embodiments, each of input paths 111 and 113 is an input terminal configured to receive the respective signal IN0[0:n] or IN1[0:n] transmitted serially or a data bus configured to receive the respective signal IN0[0:n] or IN1[0:n] transmitted in a parallel configuration.

In the embodiment depicted in FIG. 1, input circuit 110 is configured to receive a total of two input signals, each input signal including data elements including n bits each. As each of the numbers of input signals, data elements, and bits per data element increases, circuit complexity and power consumption increase along with functional capabilities, e.g., an ability to efficiently process large data sets.

In some embodiments, input circuit 110 is configured to receive a total of one or greater than two input signals. In some embodiments, input circuit 110 is configured to receive a total number of input signals ranging from four to 32. In some embodiments, input circuit 110 is configured to receive a total number of input signals ranging from eight to 16.

In some embodiments, input circuit 110 is configured to receive each data element including the number of bits equal to four. In some embodiments, input circuit 110 is configured to receive each data element including the number of bits fewer or greater than four. In some embodiments, input circuit 110 is configured to receive the number of bits of each data element ranging from one to 16. In some embodiments, input circuit 110 is configured to receive the number of bits of each data element ranging from eight to 12.

In some embodiments, input circuit 110 is configured to receive the number of data elements of each of signals IN0[0:n] and IN1[0:n] ranging from four to 512. In some embodiments, input circuit 110 is configured to receive the number of data elements of each of signals IN0[0:n] and IN1[0:n] ranging from 32 to 128.

Input circuit 110 includes one or more data registers (not shown in FIG. 1) configured to receive and temporarily store the data elements of signals IN0[0:n] and IN1[0:n], e.g., by including one or more latch or flip-flop circuits. In various embodiments, the one or more data registers are configured to receive the bit data of the data elements of signals IN0[0:n] and IN1[0:n] in parallel or in series.

The one or more data registers are coupled to one or more selection circuits (not shown in FIG. 1), e.g., multiplexers, and are configured to output the bits of a given data element to the one or more selection circuits. The one or more selection circuits are configured to sequentially output the data elements of signals IN0[0:n] and IN1[0:n] as signals X and Y in which the bits of the data elements have sequential orders based on logical levels of signal SeqSel.

Input circuit 110 includes a signal generation portion configured to receive one or more clock signals (not shown in FIG. 1), e.g., a clock signal CLK discussed below with respect to FIGS. 3A and 3B, and generate signal SeqSel alternating between a first logical level corresponding to a first sequential order, e.g., 0-to-n, and a second logical level corresponding to a second sequential order opposite the first sequential order, e.g., n-to-0. In some embodiments, the first sequential order is an LSB-to-MSB order corresponding to a progression from the LSB of a given data element to the MSB of the given data element, and the second sequential order is an MSB-to-LSB order corresponding to a progression from the MSB of a given data element to the LSB of the given data element.

The signal generation portion is configured to generate signal SeqSel having the first and second logical levels synchronized to the data elements such that all of the n bits of a given data element are output in the same sequential order. In some embodiments, the first logical level corresponds to a first mode of operation of data sequencing circuit 100 and the second logical level corresponds to a second mode of operation of data sequencing circuit 100.

Input circuit 110 is thereby configured to generate signals X and Y including the bits of the data elements of respective signals IN0[0:n] and IN1[0:n] in alternating sequence order such that adjacent bits of consecutively transmitted data elements are a same one of a MSB or LSB, and to generate signal SeqSel having alternating logical levels synchronized to the alternating sequence orders.

A storage element, e.g., storage element 120, is an electrical, electromechanical, electromagnetic, or other device configured to store one or more data elements, each data element including one or more data bits represented by logical states. In some embodiments, a logical state corresponds to a voltage level of an electrical charge stored in a portion or all of a storage element. In some embodiments, a logical state corresponds to a physical property, e.g., a resistance or magnetic orientation, of a portion or all of a storage element.

In some embodiments, the storage element includes one or more static random-access memory (SRAM) cells. In various embodiments, an SRAM cell, e.g., a five-transistor (5T), six-transistor (6T), eight-transistor (8T), or nine-transistor (9T) SRAM cell, includes a number of transistors ranging from two to twelve. In some embodiments, an SRAM cell includes a multi-track SRAM cell. In some embodiments, an SRAM cell includes a length at least two times greater than a width.

In some embodiments, the storage element includes one or more dynamic random-access memory (DRAM) cells, resistive random-access memory (RRAM) cells, magnetoresistive random-access memory (MRAM) cells, ferroelectric random-access memory (FeRAM) cells, NOR flash cells, NAND flash cells, conductive-bridging random-access memory (CBRAM) cells, data registers, non-volatile memory (NVM) cells, 3D NVM cells, or other memory cell types capable of storing bit data. In some embodiments, the storage element is a portion or all of a memory array.

Storage element 120 includes data elements W0 and W1. In some embodiments in which data sequencing circuit 100 is included in a CIM circuit, data elements W0 and W1 correspond to weight data of one or more matrix computations.

As each of the numbers of data elements and bits per data element stored in storage element 120 increases, circuit complexity and power consumption increase along with functional capabilities, e.g., increased weight data resolution.

In the embodiment depicted in FIG. 1, storage element 120 includes a total of two data elements W0 and W1. In some embodiments, storage element 120 includes one or greater than two data elements W0 and W1. In some embodiments, storage element 120 includes the number of data elements ranging from four to 1024. In some embodiments, storage element 120 includes the number of data elements ranging from eight to 128.

In some embodiments, storage element 120 is configured to store a number of bits per data element, e.g., data elements W0 and W1, ranging from one to 16. In some embodiments, storage element 120 is configured to store the number of bits per data element ranging from 4 to 8.

Storage element 120 includes one or more I/O connections (not shown) through which the logical states are programmed in write operations and accessed in read operations, e.g., a multiplication operation.

A multiplier, e.g., multiplier M0 or M1, is an electronic circuit including one or more logic gates configured to perform a mathematical operation, e.g., multiplication, based on a received data bit, e.g., one of the bits of signals X or Y, and a received data element, e.g., data element W0 or W1 received from storage element 120, thereby generating a product data element, e.g., data element P0 or P1, equal to the product of the input data bit and the input data element. In some embodiments, the multiplier is configured to generate the product data element including a number of bits equal to the number of bits of the received data element. In various embodiments, the multiplier includes one or more AND or NOR gates or other circuits suitable for performing some or all of a multiplication operation.

Data sequencing circuit 100 including input circuit 110 and multipliers M0 and M1 is thereby configured such that multipliers M0 and M1 receive respective signals X and Y in the alternating bit sequence order discussed above so as to sequentially generate corresponding instances of data elements P0 and P1 as products of respective data elements W0 and W1 multiplied by the alternatively sequenced bits of signals X and Y.

Adder 130 is an electronic circuit including multiple layers of adder circuits (not shown) in which a first layer is configured to receive a plurality of data elements, e.g., data elements P0 and P1, and a last layer includes a single logical adding device configured to generate a data element, e.g., partial sum PS, based on the received plurality of data elements. In some embodiments, each of one or more successive layers between the first and last layers is configured to receive a first number of sum data elements generated by a preceding layer, and generate a second number of sum data elements based on the first number of sum data elements, the second number being half the first number. Thus, a total number of layers includes the first and last layers and each successive layer, if present.

The total number of layers of adder 130 is configured to correspond to the number of received data elements, e.g., data elements P0 and P1. In some embodiments, adder 130 includes the total number of layers ranging from 1 to 9. In some embodiments, adder 130 includes the total number of layers ranging from 2 to 6.

An adder circuit is an electronic circuit including one or more logic gates configured to perform a mathematical operation, e.g., addition, based on received first and second data elements, e.g., data elements P0 and P1, thereby generating a sum data element equal to the sum of the received first and second data elements. In some embodiments, the adder circuit is configured to generate the sum data element including a number of bits one greater than the number of bits of each of the received first and second data elements. In various embodiments, the adder circuit includes one or more full adder gates, half adder gates, ripple-carry adder circuits, carry-save adder circuits, carry-select adder circuits, carry-look-ahead adder circuits, or other circuits suitable for performing some or all of an addition operation.

In some embodiments, each adder circuit in each layer of adder 130 is configured to generate the corresponding sum data element including a number of bits one greater than the number of bits of the sum data element of the preceding layer or, in the case of the first layer, the data element of the received plurality of data elements.

Data bus PSB includes a number of signal paths at least equal to the number of bits of the sum data element of the last layer of adder circuits. Adder 130 is configured to output the bits of partial sum PS on data bus PSB arranged from an LSB to an MSB.

In some embodiments, data bus PSB includes the number of signal paths at least two greater than the number of bits of the sum data element of the last layer of adder circuits, and adder 130 is configured to generate and append partial sum PS by including a number of bits at least two greater than the number of bits of the sum data element of the last layer of adder circuits.

In such embodiments, each of the additional at least two bits has a low logical level, and adder 130 is configured to output the additional bits at outermost signal paths of data bus PSB such that, in operation, partial sum PS is extended in each of an LSB direction and an MSB direction by at least one bit having the low logical level. In some embodiments, adder 130 is configured to output the additional bits at the outermost signal paths of data bus PSB such that, in operation, partial sum PS is extended in each of the LSB and MSB directions by a total number of low logical level bits one less than the number of bits per data element of signals IN0[0:n], IN1[0:n], X, and Y, i.e., the total number of low logical level bits in each direction equal to n.

Data sequencing circuit 100 including input circuit 110 and adder 130 is thereby configured such that adder 130 receives the sequentially generated instances of data elements P0 and P1, and sequentially generates instances of partial sum PS as sums of the sequentially generated instances of data elements P0 and P1 in accordance with the alternatively sequenced bits of signals X and Y discussed above.

Accumulator 140 is an electronic circuit including an adder circuit, a data register, first and second shifters, and first and second selection circuits (not shown in FIG. 1) collectively coupled in a feedback arrangement. The feedback arrangement includes the first selection circuit, the adder circuit, and the data register coupled in series between data busses PSB and OUTB, a first feedback path including the second selection circuit and the first shifter coupled between data bus OUTB and the adder circuit, and a second feedback path including the second selection circuit and the second shifter coupled between data bus OUTB and the adder circuit. In some embodiments, accumulator 140 includes accumulator 400 discussed below with respect to FIGS. 4A and 4B.

In various embodiments, a given one of the adder circuit, data register, two shifters, and two selection circuits is a standalone circuit, a collection of circuits, or a portion of larger circuit. In some embodiments the two shifters are portions of a same shifter circuit, e.g., a reconfigurable circuit, and/or the two selection circuits are portions of a same circuit.

The first selection circuit is coupled to adder 130 through data bus PSB and thereby configured to receive the instances of partial sum PS on data bus PSB, and each of the first and second selection circuits is coupled to input circuit 110 through input terminal 141 and thereby configured to receive signal SeqSel from input circuit 110.

The first selection circuit is configured to, in operation, respond to signal SeqSel having the first logical level by selecting the instances of partial sum PS appended at a first LSB/MSB end as discussed above, respond to signal SeqSel having the second logical level by selecting the instances of partial sum PS appended at a second LSB/MSB end as discussed above, and output the selected instances of partial sum PS, as appended, to the adder circuit. In various embodiments, the first selection circuit is configured to select partial sum PS appended based on the additional bits received from adder 130 as discussed above or from one or more other sources, e.g., from within the first selection circuit.

The second selection circuit is configured to, in operation, respond to signal SeqSel having the first logical level by coupling the first shifter in the first feedback path, and respond to signal SeqSel having the second logical level by coupling the second shifter in the second feedback path. The first shifter is configured to perform one of a right shift (in the LSB direction) or left shift (in the MSB direction) operation, and the second shifter is configured to perform the other of the right shift or left shift operation.

The first and second selection circuits are thereby configured to, in operation, select a given instance of partial sum PS appended at the LSB end simultaneously with coupling the first or second shifter configured to perform the right shift operation, and select a given instance of partial sum PS appended at the MSB end simultaneously with coupling the first or second shifter configured to perform the left shift operation.

Data sequencing circuit 100 including input circuit 110 is configured to generate signal SeqSel whereby, in operation, selecting the instances of partial sum PS appended at the LSB end and coupling the first or second shifter configured to perform the right shift operation are performed simultaneously with signals X and Y having the LSB-to-MSB sequential order, e.g., in the first mode of operation, and selecting the instances of partial sum PS appended at the MSB end and coupling the first or second shifter configured to perform the left shift operation are performed simultaneously with signals X and Y having the MSB-to-LSB sequential order, e.g., in the second mode of operation.

The adder circuit is configured to, in operation, receive the instances of partial sum PS, as appended, in the corresponding sequential order, and a shifted data element output from the first or second shifter, and generate a sequence of internal sum data elements (not shown in FIG. 1) based on the sequence of the instances of partial sum PS and shifted data elements.

The data register is configured to receive and store each of the internal sum data elements, and to output the internal sum elements as signal OUT to data bus OUTB and to the first and second feedback paths.

Accumulator 140 is thereby configured to, responsive to signal SeqSel received at input terminal 141, perform a first accumulation operation in the sequential order of the instances of partial sum PS corresponding to signals X and Y having the LSB-to-MSB sequential order, and a second accumulation operation in the sequential order of the instances of partial sum PS corresponding to signals X and Y having the MSB-to-LSB sequential order.

Data sequencing circuit 100 is configured as discussed above to transmit the n bits of successive data elements of signals IN0[1:n] and IN1[1:n] as signals X and Y to multipliers M0 and M1 in alternating sequence order, e.g., in first and second operational modes, such that adjacent bits of consecutively transmitted data elements are a same one of a MSB or LSB. Data sequencing circuit 100 including accumulator 140 configured as discussed above is thereby capable of performing matrix operations including reduced signal toggling rates, and therefore power consumption, compared to approaches in which bits are not transmitted in alternating sequence order.

Figure 2:
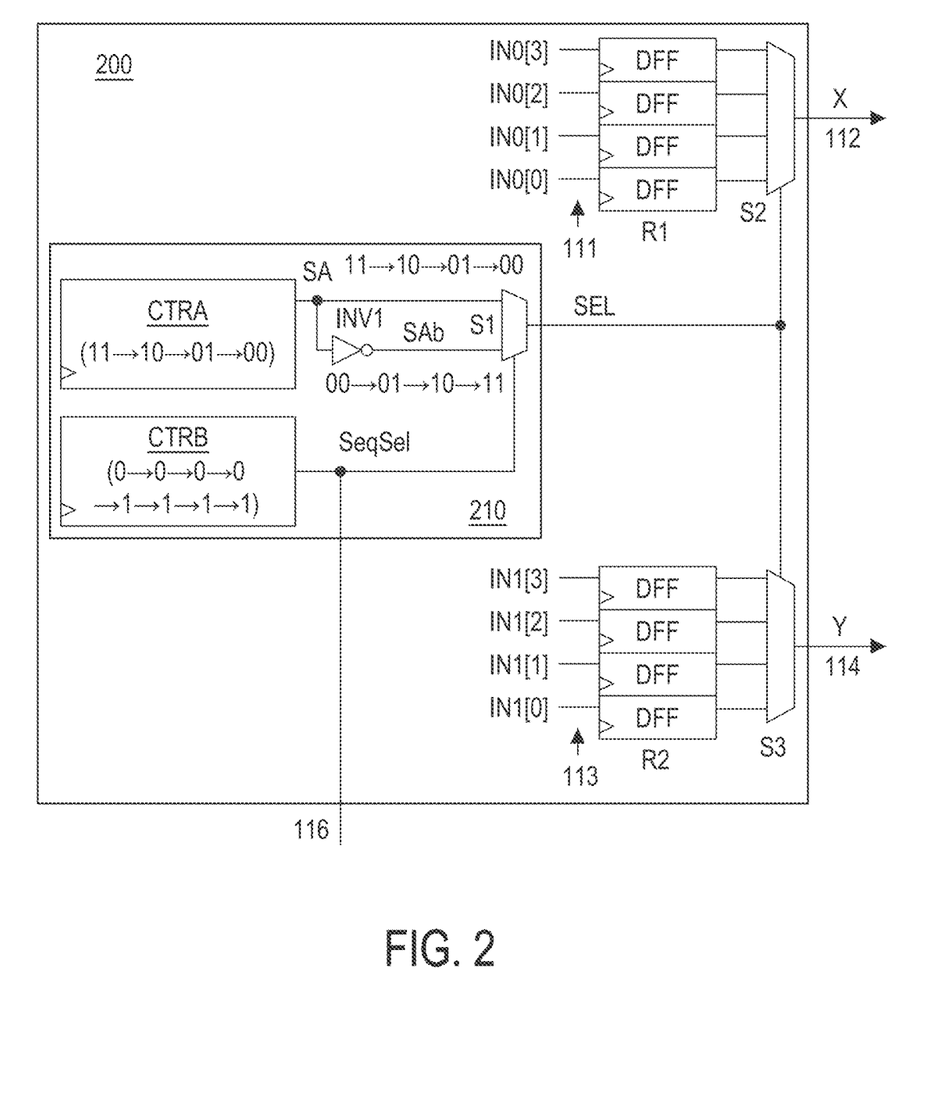
FIG. 2 is a schematic diagram of an input circuit, in accordance with some embodiments.

FIG. 2 is a schematic diagram of input circuit 200, in accordance with some embodiments. Input circuit 200 is usable as some or all of input circuit 110 discussed above with respect to FIG. 1.

Input circuit 200 includes a signal generation portion 210, data registers R1 and R2, and selection circuits S2 and S3. Signal generation portion 210 includes counters CTRA and CTRB, an inverter INV1, and a selection circuit S1. In some embodiments, selection circuits S1-S3 are also referred to as multiplexers S1-S3.

In the embodiment depicted in FIG. 2, input circuit 200 includes each of input paths 111 and 113 discussed above configured as a data bus on which respective signals IN0[0:n] and IN1[0:n] are received for the case in which n=3, corresponding to a total of four bits per data element. In some embodiments, input circuit 200 includes each of input paths 111 and 113 otherwise configured, e.g., to receive signals IN0[0:n] and IN1[0:n] corresponding to a total of fewer or greater than four bits per data element.

Data register R1 is coupled to input path 111 and is thereby configured to receive signal IN0[0:n], represented in FIG. 2 as a single data element including bits IN0[0] through IN0[3]. Output terminals (not labeled) of data register R1 are coupled to input terminals (not labeled) of selection circuit S2.

Data register R2 is coupled to input path 113 and is thereby configured to receive signal IN1[0:n], represented in FIG. 2 as a single data element including bits IN1[0] through IN1[3]. Output terminals (not labeled) of data register R2 are coupled to input terminals (not labeled) of selection circuit S3.

In the embodiment depicted in FIG. 2, each of data registers R1 and R2 includes a total of four data flip-flops DFF corresponding to the four bits per data element IN0[0] through IN0[3] and IN1[0] through IN1[3]. Each data flip-flop DFF is configured to receive a clock signal (not shown in FIG. 2) such that successive instances of the data elements of signals IN0[0:n] and IN1[0:n] are synchronously latched and output to respective selection circuits S2 and S3 based on the clock signal. In some embodiments, each data flip-flop DFF is configured to receive signal SeqSel discussed above.

Each of counters CTRA and CTRB is configured to receive the clock signal and, based thereon, generate a respective one of a signal SA or signal SeqSel discussed above. An output terminal (not labeled) of counter CTRA is coupled to input terminals (not labeled) of each of selection circuit S1 and inverter INV1, an output terminal (not labeled) of inverter INV1 is coupled to an input terminal (not labeled) of selection circuit S1, and an output terminal (not labeled) of counter CTRB is coupled to an input terminal (not labeled) of selection circuit S1 and to output terminal 116 discussed above. An output terminal (not labeled) of selection circuit S1 is coupled to input terminals (not labeled) of each of selection circuits S2 and S3, and output terminals (not labeled) of selection circuits S2 and S3 are coupled to respective output terminals 112 and 114 discussed above.

In the embodiment depicted in FIG. 2, counter CTRA is configured to generate signal SA including sequential data elements having cyclical values that decrement from the highest numbered bit of each data element of signals IN0[0:n] and IN1[0:n] to zero, e.g., from three to zero. Based on signal SA, inverter INV1 generates a signal SAb including sequential data elements having cyclical values that increment from zero to the highest numbered bit of each data element of signals IN0[0:n] and IN1[0:n], e.g., from zero to three.

Counter CTRA and inverter INV1 are thereby configured to output complementary signals SA and SAb to selection circuit S1 in which sequential data elements have cyclical values that step in opposite directions. In some embodiments, counter CTRA and inverter INV1 are otherwise configured to output complementary signals SA and SAb to selection circuit S1 in which sequential data elements have cyclical values that step in opposite directions, e.g., by including counter CTRA configured to generate signal SA including sequential data elements having cyclical values that increment from zero to the highest numbered bit of each data element of signals IN0[0:n] and IN1[0:n].

Counter CTRB is configured to generate signal SeqSel including sequential bits having each of the low and high logical levels for a number of periods of the clock signal equal to the number of bits of each data element of signals IN0[0:n] and IN1[0:n]. Counters CTRA and CTRB are configured such that endpoints of the cycles of values, i.e., times at which CTRA restarts the cycles of values, are synchronized to transitions in signal SeqSel between the low and high logical levels.

Selection circuit S1 is configured to, responsive to the alternating logical levels of signal SeqSel, output alternating ones of signals SA or SAb as a signal SEL, also referred to as a selection signal SEL in some embodiments, to each of selection circuits S2 and S3. In response to signal SEL, selection circuit S2 is configured to generate signal X by sequentially selecting bits IN0[0] through IN0[3] in alternating orders corresponding to the selected signals SA and SAb, and selection circuit S3 is configured to generate signal Y by sequentially selecting bits IN1[0] through IN1[3] in alternating orders corresponding to the selected signals SA and SAb.

The number of selection circuits configured to receive signal SEL and sequentially select bits in alternating orders depicted in FIG. 2 is a non-limiting example. In various embodiments, input circuit 200 includes a single one of selection circuits S2 or S3 or includes one or more selection circuits in addition to selection circuits S2 and S3 configured to receive signal SEL.

By the configuration discussed above, input circuit 200 is capable of executing the operations discussed above with respect to input circuit 110 and FIG. 1, e.g., operating in the first and second operational modes, such that a circuit including input circuit 200 is capable of realizing the benefits discussed above with respect to data sequencing circuit 100.

Figure 3A:
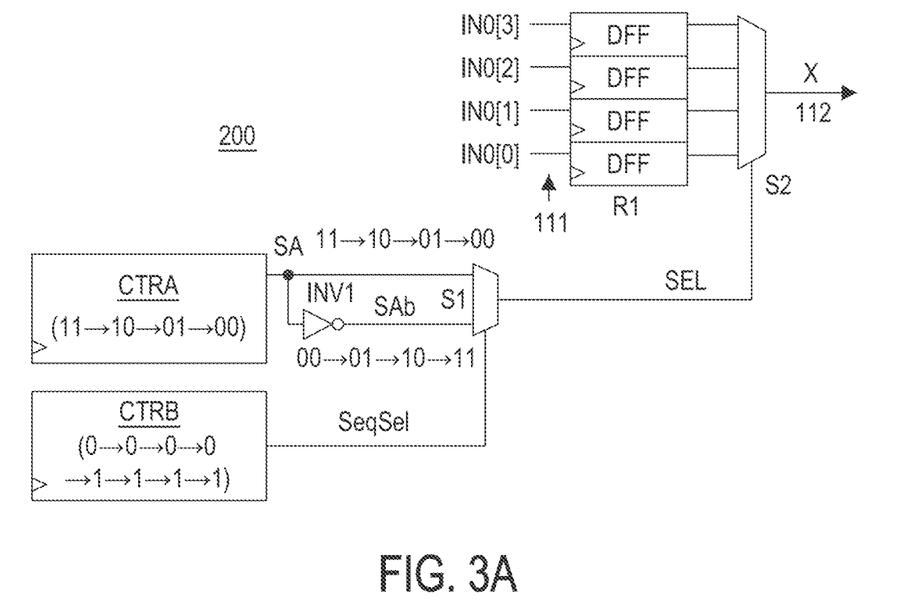
FIGS. 3A and 3B are a respective schematic diagram of an input circuit and operating parameters of the input circuit, in accordance with some embodiments.
Figure 3B:
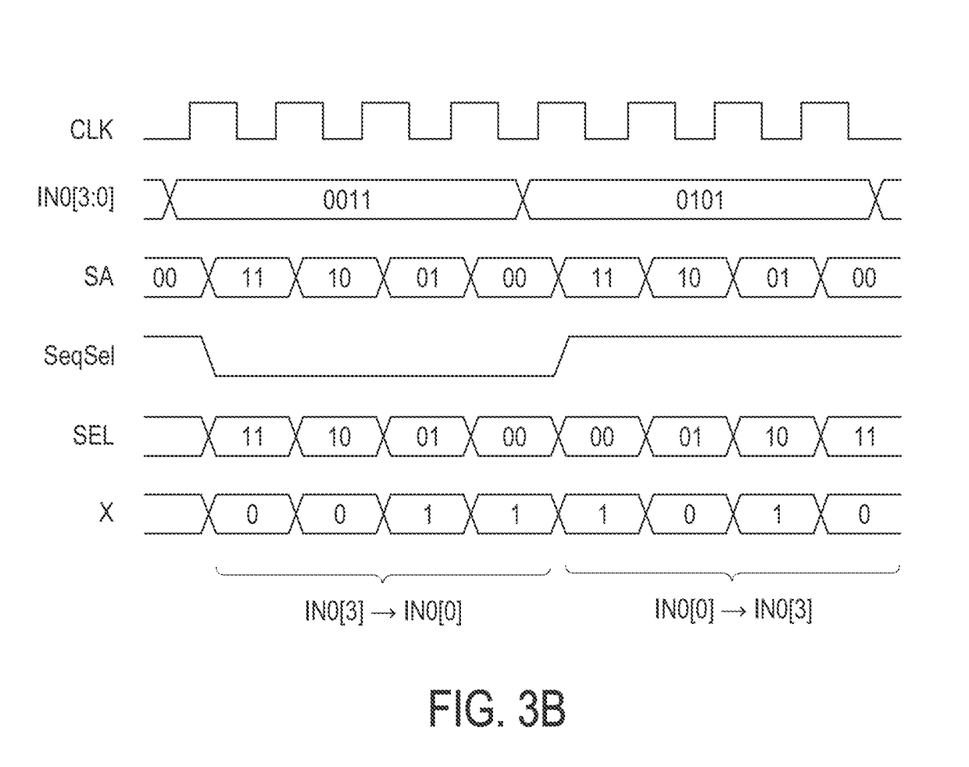

FIGS. 3A and 3B are a respective schematic diagram of a portion of input circuit 200 and corresponding operating parameters, in accordance with some embodiments. FIG. 3A includes counters CTRA and CTRB, inverter INV1, selections circuits S1 and S2, and data register R1, each discussed above with respect to FIG. 2. FIG. 3B depicts each of clock signal CLK and signals IN0[0:n] (depicted as IN0[3:0]), SA, SeqSel, SEL, and X discussed above for a non-limiting example in which n=3 corresponding to a total of four bits per data element of signal IN0[0:n].

In the example illustrated in FIG. 3B, signal IN0[3:0] includes a first data element 0011 including four bits corresponding to four periods of clock signal CLK, and a second data element 0101 including four bits corresponding to four periods of clock signal CLK.

Counter CTRA generates signal SA having cyclical values in decreasing order from 11 to 00, and counter CTRB generates signal SeqSel alternating between the low and high logical levels. Selection circuit S1 thereby generates signal SEL having a first sequence of values (corresponding to signal SA) in decreasing order from 11 to 00 and a second sequence of values (corresponding to signal SAb) in increasing order from 00 to 11.

Selection circuit S2 generates a first data element 0011 of signal X by selecting the bits of the first data element 0011 of signal IN0[3:0] in a first order such that the first data element 0011 of signal X matches the first data element 0011 of signal IN0[3:0]. Selection circuit S2 generates a second data element 1010 of signal X by selecting the bits of the second data element 0101 of signal IN0[3:0] in a second order such that the second data element 1010 of signal X has an order opposite the order of the second data element 0101 of signal IN0[3:0].

Figure 4A:
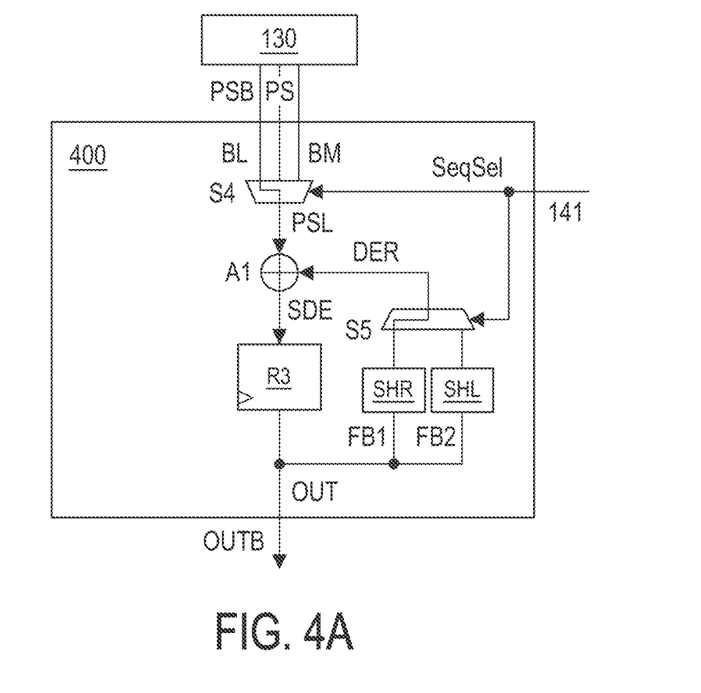
FIGS. 4A and 4B are schematic diagrams of an accumulator, in accordance with some embodiments.
Figure 4B:
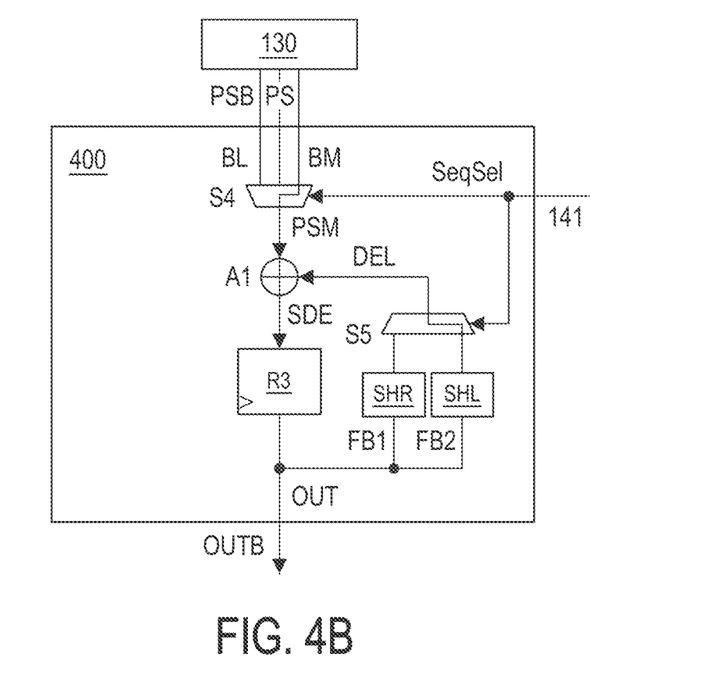

FIGS. 4A and 4B are schematic diagrams of accumulator 400, in accordance with some embodiments. Accumulator 400 is usable as some or all of accumulator 140 discussed above with respect to FIG. 1. FIG. 4A depicts accumulator 400 corresponding to signal SeqSel having the first logical level and each of signals X and Y having the LSB-to-MSB sequential order, e.g., operating in the first operational mode, and FIG. 4B depicts accumulator 400 corresponding to signal SeqSel having the second logical level and each of signals X and Y having the MSB-to-LSB sequential order, e.g., operating in the second operational mode.

Accumulator 400 includes a selection circuit S4, an adder circuit A1, and a data register R3 coupled in series between data busses PSB and OUTB, a first feedback path FB1 including a selection circuit S5 and a right shifter SHR coupled between data bus OUTB and adder circuit A1, and a second feedback path FB2 including selection circuit S5 and a left shifter SHL coupled between data bus OUTB and adder circuit A5.

Selection circuit S4 includes a plurality of input terminals (not labeled) coupled to adder 130 through data bus PSB and thereby configured to receive the instances of partial sum PS on data bus PSB appended as discussed above with respect to adder 130 and FIG. 1. In the embodiment depicted in FIGS. 4A and 4B, selection circuit S4 is configured to receive at least one additional bit BL and at least one additional bit BM from adder 130. In some embodiments, selection circuit S4 is otherwise configured to receive some or all of additional bits BL and BM, e.g., from within selection circuit S4.

Selection circuit S4 includes an input terminal (not labeled) coupled to input terminal 141 and is thereby configured to receive signal SeqSel from input circuit 110. Selection circuit S4 is configured to, in operation, respond to signal SeqSel having the first logical level by selecting the instances of partial sum PS appended at the LSB end with the at least one additional bit BL, as depicted in FIG. 4A, and respond to signal SeqSel having the second logical level by selecting the instances of partial sum PS appended at the MSB end with the at least one additional bit BM, as depicted in FIG. 4B.

Selection circuit S4 includes a plurality of output terminals (not labeled) coupled to a plurality of input terminals (not labeled) of adder circuit A1, and is thereby configured to output the selected instances of partial sum PS appended with the at least one additional bit BL to adder circuit A1 as instances of a data element PSL, as depicted in FIG. 4A, and to output the selected instances of partial sum PS appended with the at least one additional bit BM to adder circuit A1 as instances of a data element PSM, as depicted in FIG. 4B.

Selection circuit S5 includes an input terminal (not labeled) coupled to input terminal 141 and is thereby configured to receive signal SeqSel from input circuit 110. Selection circuit S5 is configured to, in operation, respond to signal SeqSel having the first logical level by coupling right shifter SHR in first feedback path FB1 as depicted in FIG. 4A, and respond to signal SeqSel having the second logical level by coupling left shifter SHL in second feedback path FB2 as depicted in FIG. 4B.

Selection circuits S4 and S5 are thereby configured such that, in operation, selection circuit S4 outputs instances of data element PSL simultaneously with selection circuit S5 coupling shifter SHR in first feedback path FB1, and selection circuit S4 outputs instances of data element PSM simultaneously with selection circuit S5 coupling shifter SHL in second feedback path FB2.

Data sequencing circuit 100 including input circuit 110 is configured to generate signal SeqSel whereby, in operation, selection circuits S4 and S5 outputting instances of data element PSL and coupling shifter SHR in first feedback path FB1 are performed simultaneously with signals X and Y having the LSB-to-MSB sequential order, e.g., in the first mode of operation, and selection circuits S4 and S5 outputting instances of data element PSM and coupling shifter SHL in second feedback path FB2 are performed simultaneously with signals X and Y having the MSB-to-LSB sequential order, e.g., in the second mode of operation.

Each of shifters SHR and SHL includes a plurality of input terminals (not labeled) coupled to data bus OUTB and a plurality of output terminals (not labeled) coupled to a plurality of input terminals (not labeled) of selection circuit S5, and selection circuit S5 includes a plurality of output terminals (not labeled) coupled to the plurality of input terminals of adder circuit A1.

Shifter SHR is thereby configured to, in operation, receive instances of signal OUT on data bus OUTB, perform a right-shift function on the received instances, and output the right-shifted instances as instances of a data element DER to selection circuit S5. Shifter SHL is thereby configured to, in operation, receive the instances of signal OUT on data bus OUTB, perform a left-shift function on the received instances, and output the left-shifted instances as instances of a data element DEL to selection circuit S5.

During periods in which selection circuit S5 couples shifter SHR in first feedback path FB1, selection circuit S5 thereby outputs the instances of data element DER to adder circuit A1, as depicted in FIG. 4A, and during periods in which selection circuit S5 couples shifter SHL in second feedback path FB2, selection circuit S5 thereby outputs the instances of data element DEL to adder circuit A1, as depicted in FIG. 4B.

Adder circuit A1 is thereby configured to, in operation, receive the instances of data element PSL simultaneously with receiving the instances of data element DER as depicted in FIG. 4A, and receive the instances of data element PSM simultaneously with receiving the instances of data element DEL as depicted in FIG. 4B.

Adder circuit A1 includes a plurality of output terminals (not labeled) coupled a plurality of input terminals (not labeled) of data register R3, and is thereby configured to generate and output to data register R3 a sequence of instances of a sum data element SDE equal to either the sum of the instances of data elements PSL and DER, e.g., in the first operational mode, or the sum of the instances of data elements PSM and DEL, e.g., in the second operational mode.

Data register R3 is configured to receive a clock signal, e.g., clock signal CLK discussed above with respect to FIGS. 3A and 3B, and includes a plurality of output terminals (not labeled) coupled to data bus OUTB. Data register R3 is thereby configured to, in accordance with the clock signal, receive, store, and output the instances of sum data element SDE as signal OUT to data bus OUTB and to first feedback path FB1 and second feedback path FB2. In various embodiments, the clock signal is the one or more clock signals received by input circuit 110 or a separate clock signal synchronized with the one or more clock signals received by input circuit 100 whereby operations of accumulator 400 are synchronized to those of input circuit 110 as discussed above.

Accumulator 400 is thereby configured to, in operation, in response to signal SeqSel having the first logical level, perform a first accumulation operation based on the instances of data element PSL corresponding to signals X and Y having the LSB-to-MSB sequential order, and in response to signal SeqSel having the second logical level, perform a second accumulation operation based on the instances of data element PSM corresponding to signals X and Y having the MSB-to-LSB sequential order.

By the configuration discussed above, accumulator 400 is capable of performing matrix operations as discussed above with respect to accumulator 140 and FIG. 1, e.g., operating in the first and second operational modes, such that a circuit including accumulator 400 is capable of realizing the benefits discussed above with respect to data sequencing circuit 100.

Figure 5:
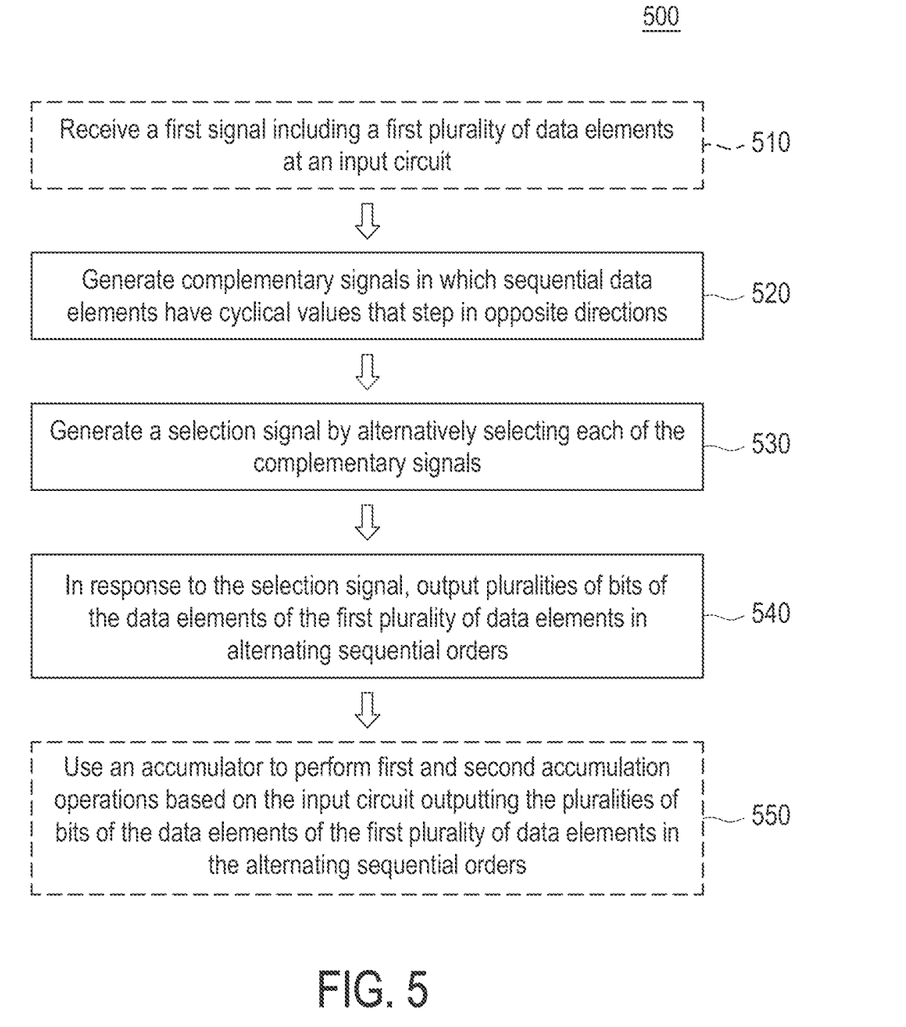
FIG. 5 is a flowchart of a method of performing a data sequencing operation, in accordance with some embodiments.

FIG. 5 is a flowchart of method 500 of operating a data sequencing circuit, in accordance with some embodiments. Method 500 is usable with a data sequencing circuit, e.g., data sequencing circuit 100 discussed above with respect to FIGS. 1-4B. In various embodiments, method 500 includes performing a sequencing operation including some or all of operations 510-550 and/or performing a matrix operation including some or all of operations 510-550, each discussed below.

The sequence in which the operations of method 500 are depicted in FIG. 5 is for illustration only; the operations of method 500 are capable of being executed in sequences that differ from that depicted in FIG. 5. In some embodiments, operations in addition to those depicted in FIG. 5 are performed before, between, during, and/or after the operations depicted in FIG. 5. In some embodiments, the operations of method 500 are a subset of a method of performing a CIM operation.

At operation 510, in some embodiments, a first signal including a first plurality of data elements is received at an input circuit. In some embodiments, receiving the first signal includes receiving signal IN0[0:n] at input circuit 110 as discussed above with respect to FIGS. 1-3B.

In some embodiments, receiving the first signal at the input circuit includes receiving a second signal at the input circuit, the second signal including a second plurality of data elements. In some embodiments, receiving the second signal at the input circuit includes receiving signal IN1[0:n] at input circuit 110 as discussed above with respect to FIGS. 1-3B.

At operation 520, complementary signals are generated in which sequential data elements have cyclical values that step in opposite directions. In some embodiments, generating the complementary signals includes generating signals SA and SAb as discussed above with respect to FIGS. 2-3B.

In some embodiments, generating the complementary signals includes using a first counter, e.g., counter CTRA discussed above with respect to FIGS. 2-3B, to generate a first one of the complementary signals including the sequential data elements having the values that decrement from the highest numbered bit of each data element of the first plurality of data elements to zero, e.g., signal SA, and using an inverter, e.g., inverter INV1, to generate the second one of the complementary signals including the sequential data elements having the values that increment from zero to the highest numbered bit of each data element of the first plurality of data elements, e.g., signal SAb.

At operation 530, a selection signal is generated by alternatively selecting each of the complementary signals. In some embodiments, generating the selection signal includes generating selection signal SEL as discussed above with respect to FIGS. 1-3B.

Alternatively selecting each of the complementary signals includes using a selection circuit, e.g., selection circuit S1 discussed above with respect to FIG. 2.

In some embodiments, the selection signal is a first selection signal and generating the selection signal includes generating a second selection signal, e.g., signal SeqSel discussed above with respect to FIGS. 1-4B.

In some embodiments, generating the second selection signal includes using a second counter, e.g., counter CTRB discussed above with respect to FIG. 2, to generate the second selection signal. In some embodiments, generating the second selection signal includes outputting the second selection signal from the input circuit, e.g., outputting signal SeqSel from input circuit 110 as discussed above with respect to FIGS. 1-4B.

At operation 540, in response to the selection signal, pluralities of bits of the data elements of the first plurality of data elements are output in alternating sequential orders. In some embodiments, outputting the pluralities of bits of the data elements of the first plurality of data elements includes outputting signal X as discussed above with respect to FIGS. 1-4B.

In some embodiments, outputting the pluralities of bits of the data elements of the first plurality of data elements includes outputting pluralities of bits of the data elements of the second plurality of data elements in the alternating sequential orders. In some embodiments, outputting the pluralities of bits of the data elements of the second plurality of data elements includes outputting signal Y as discussed above with respect to FIGS. 1-4B.

In some embodiments, outputting the pluralities of bits of the data elements of the first and/or second pluralities of data elements includes outputting the pluralities of bits to one or more multipliers, e.g., multipliers M0 and/or M1 discussed above with respect to FIGS. 1-4B.

At operation 550, in some embodiments, an accumulator is used to perform first and second accumulation operations based on the input circuit outputting the pluralities of bits of the data elements of the first plurality of data elements in the alternating sequential orders. In some embodiments, using the accumulator includes using accumulator 140 as discussed above with respect to FIGS. 1-4B.

In some embodiments, using the accumulator to perform the first accumulation operation includes using a first shifter configured to perform a right shift operation, e.g., shifter SHR discussed above with respect to FIGS. 4A and 4B, and using the accumulator to perform the second accumulation operation includes using a second shifter configured to perform a left shift operation, e.g., shifter SHL.

In some embodiments, using the accumulator to perform the first accumulation operation includes performing a right shift operation simultaneously with the selection circuit outputting the pluralities of bits of the data elements of the first plurality of data elements in a first sequential order of the alternating sequential orders being an LSB-to-MSB sequential order, and using the accumulator to perform the second accumulation operation includes performing a left shift operation simultaneously with the first selection circuit outputting the pluralities of bits of the data elements of the first plurality of data elements in a second sequential order of the alternating sequential orders being an MSB-to-LSB sequential order.

By executing some or all of the operations of method 500, bits of successive data elements of input signals are transmitted to multipliers in alternating sequence order, e.g., in first and second operational modes, such that adjacent bits of consecutively transmitted data elements are a same one of a MSB or LSB, thereby achieving the benefits discussed above with respect to data sequencing circuit 100.

In some embodiments, a circuit includes a data register configured to receive and output successive data elements of a plurality of data elements responsive to a clock signal, wherein each data element of the plurality of data elements includes a total number of bits N, a signal generation portion configured to output a first selection signal responsive to the clock signal, wherein the first selection signal includes two alternating sequences, values of the first sequence increment from zero to N−1, and values of the second sequence decrement from N−1 to zero, and a selection circuit coupled to the data register and configured to output the N bits of each data element of the plurality of data elements in a first sequential order responsive to the first sequence of the first selection signal, and in a second sequential order opposite the first sequential order responsive to the second sequence of the first selection signal. In some embodiments, the data register is configured to receive the N bits of each data element of the plurality of data elements in parallel. In some embodiments, the signal generation portion includes another selection circuit configured to receive complementary signals based on the clock signal, and responsive to a second selection signal based on the clock signal, output the complementary signals as the two alternating sequences of the first selection signal. In some embodiments, the signal generation portion includes a first counter and an inverter configured to generate the complementary signals based on the clock signal, and a second counter configured to generate the second selection signal based on the clock signal. In some embodiments, the total number of bits N is equal to four. In some embodiments, a total number of data elements of the plurality of data elements has a value ranging from four to 512. In some embodiments, the plurality of data elements is a first plurality of data elements of multiple pluralities of data elements, each data element including the total number of bits N, the data register is a first data register of a plurality of data registers configured to receive and output corresponding successive pluralities of data elements of the multiple pluralities of data elements, the selection circuit is a first multiplexer of a plurality of multiplexers coupled to corresponding data registers of the plurality of data registers, and each multiplexer of the plurality of multiplexers is configured to output the N bits of each data element of the corresponding plurality of data elements in the first and second sequential orders responsive to the respective first and second sequences of the first selection signal. In some embodiments, a total number of each of the pluralities of data elements of the multiple pluralities of data elements, data registers of the plurality of data registers, and multiplexers of the plurality of multiplexers has a value ranging from four to 32.

In some embodiments, a memory circuit includes an input circuit including a first data register configured to receive and output successive data elements of a first plurality of data elements responsive to a clock signal, wherein each data element of the first plurality of data elements includes a total number of bits N, a signal generation portion configured to output first and second selection signals responsive to the clock signal, wherein the first selection signal includes two alternating sequences, values of the first sequence increment from zero to N−1, and values of the second sequence decrement from N−1 to zero, and a first selection circuit coupled to the first data register and configured to output the N bits of each data element of the first plurality of data elements in a first sequential order responsive to the first sequence of the first selection signal and in a second sequential order opposite the first sequential order responsive to the second sequence of the first selection signal, a first multiplier coupled to the first selection circuit, an adder coupled to the first multiplier, and an accumulator coupled to the adder, wherein the accumulator is configured to, responsive to the second selection signal, perform a first accumulation operation synchronized to the first sequential order and a second accumulation operation synchronized to the second sequential order. In some embodiments, the input circuit includes a second data register configured to receive and output successive data elements of a second plurality of data elements responsive to the clock signal, wherein each data element of the second plurality of data elements includes the total number of bits N, and a second selection circuit coupled to the second data register and configured to output the N bits of each data element of the second plurality of data elements in the first and second sequential orders responsive to the respective first and second sequences of the first selection signal, the memory circuit includes a second multiplier coupled to the second selection circuit and to the adder, the first and second multipliers are configured to output first and second product data elements by multiplying the successive data elements of the first and second pluralities of data elements with stored data elements, and the adder is configured to output successive partial sum data elements to the accumulator by adding the first and second product data elements and extending each partial sum data element with a first low logical level bit in an LSB direction and a second low logical level bit in an MSB direction. In some embodiments, the accumulator includes an adder circuit and a third selection circuit coupled to the adder and configured to, responsive to the second selection signal, propagate the successive partial sum data elements to the adder circuit by including the first low logical level bit and excluding the second low logical level bit during the first accumulation operation corresponding to the first sequential order being an LSB-to-MSB sequential order, and propagate the successive partial sum data elements to the adder circuit by excluding the first low logical level bit and including the second low logical level bit during the second accumulation operation corresponding to the second sequential order being an MSB-to-LSB sequential order. In some embodiments, the accumulator includes a third data register configured to receive successive sum data elements from the adder circuit based on the propagated successive partial sum data elements, a first shifter configured to perform a right shift operation on a signal output from the third data register, a second shifter configured to perform a left shift operation on the signal output from the third data register, and a fourth selection circuit configured to, responsive to the second selection signal, couple the first shifter between the third data register and the adder circuit during the first accumulation operation and couple the second shifter between the third data register and the adder circuit during the second accumulation operation. In some embodiments, the accumulator is configured to output the signal from the third data register to an output data bus. In some embodiments, the signal generation portion of the input circuit includes a second selection circuit configured to receive complementary signals based on the clock signal and, responsive to the second selection signal, output the complementary signals as the two alternating sequences of the first selection signal. In some embodiments, the signal generation portion of the input circuit includes a first counter and an inverter configured to generate the complementary signals based on the clock signal, and a second counter configured to generate the second selection signal based on the clock signal.

In some embodiments, a method of operating a memory circuit includes receiving first and second signals at an input circuit, each of the first and second signals including a plurality of N-bit data elements, generating a first selection signal including two alternating sequences in which values of the first sequence increment from zero to N−1 and values of the second sequence decrement from N−1 to zero, in response to the first selection signal, outputting the N bits of successive data elements of the first and second signals from the input circuit to first and second multipliers in alternating sequential orders, using the first and second multipliers to output first and second product data elements by multiplying the successive data elements of the first and second signals with stored data elements, using an adder to output successive partial sum data elements by adding the first and second product data elements, and using an accumulator to perform a first accumulation operation synchronized to the first sequential order and a second accumulation operation synchronized to the second sequential order. In some embodiments, generating the first selection signal includes selecting complementary signals corresponding to the two alternating sequences in response to a second selection signal, and using the accumulator to perform the first and second accumulation operations is in response to the second selection signal. In some embodiments, using the adder to output the successive partial sum data elements includes extending each partial sum data element with a first low logical level bit in an LSB direction and a second low logical level bit in an MSB direction. In some embodiments, using the accumulator to perform the first accumulation operation includes including the first low logical level bit and excluding the second low logical level bit of each partial sum data element corresponding to a first sequential order of the alternating sequential orders being an LSB-to-MSB sequential order, and using the accumulator to perform the second accumulation operation includes excluding the first low logical level bit and including the second low logical level bit of each partial sum data element corresponding to a second sequential order of the alternating sequential orders being an MSB-to-LSB sequential order. In some embodiments, using the accumulator to perform the first accumulation operation includes feeding an output signal back to an adder circuit by performing a right shift operation, and using the accumulator to perform the second accumulation operation includes feeding the output signal back to the adder circuit by performing a left shift operation.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A circuit comprising:
a data register configured to receive and output successive data elements of a plurality of data elements responsive to a clock signal, wherein each data element of the plurality of data elements comprises a total number of bits N;
a signal generation portion configured to output a first selection signal responsive to the clock signal, wherein
the first selection signal comprises two alternating sequences,
values of the first sequence increment from zero to N−1, and
values of the second sequence decrement from N−1 to zero; and
a selection circuit coupled to the data register and configured to output the N bits of each data element of the plurality of data elements:
in a first sequential order responsive to the first sequence of the first selection signal, and
in a second sequential order opposite the first sequential order responsive to the second sequence of the first selection signal.

2. The circuit of claim 1, wherein the data register is configured to receive the N bits of each data element of the plurality of data elements in parallel.

3. The circuit of claim 1, wherein the signal generation portion comprises another selection circuit configured to:
receive complementary signals based on the clock signal, and
responsive to a second selection signal based on the clock signal, output the complementary signals as the two alternating sequences of the first selection signal.

4. The circuit of claim 3, wherein the signal generation portion further comprises:

a first counter and an inverter configured to generate the complementary signals based on the clock signal; and
a second counter configured to generate the second selection signal based on the clock signal.

5. The circuit of claim 1, wherein the total number of bits N is equal to four.

6. The circuit of claim 1, wherein a total number of data elements of the plurality of data elements has a value ranging from four to 512.

7. The circuit of claim 1, wherein
the plurality of data elements is a first plurality of data elements of multiple pluralities of data elements, each data element comprising the total number of bits N,
the data register is a first data register of a plurality of data registers configured to receive and output corresponding successive pluralities of data elements of the multiple pluralities of data elements,
the selection circuit is a first multiplexer of a plurality of multiplexers coupled to corresponding data registers of the plurality of data registers, and
each multiplexer of the plurality of multiplexers is configured to output the N bits of each data element of the corresponding plurality of data elements in the first and second sequential orders responsive to the respective first and second sequences of the first selection signal.

8. The circuit of claim 7, wherein a total number of each of the pluralities of data elements of the multiple pluralities of data elements, data registers of the plurality of data registers, and multiplexers of the plurality of multiplexers has a value ranging from four to 32.

9. A memory circuit comprising:
an input circuit comprising:
a first data register configured to receive and output successive data elements of a first plurality of data elements responsive to a clock signal, wherein each data element of the first plurality of data elements comprises a total number of bits N;
a signal generation portion configured to output first and second selection signals responsive to the clock signal, wherein
the first selection signal comprises two alternating sequences,
values of the first sequence increment from zero to N−1, and
values of the second sequence decrement from N−1 to zero; and
a first selection circuit coupled to the first data register and configured to output the N bits of each data element of the first plurality of data elements:
in a first sequential order responsive to the first sequence of the first selection signal, and
in a second sequential order opposite the first sequential order responsive to the second sequence of the first selection signal;
a first multiplier coupled to the first selection circuit;
an adder coupled to the first multiplier; and
an accumulator coupled to the adder,
wherein the accumulator is configured to, responsive to the second selection signal, perform a first accumulation operation synchronized to the first sequential order and a second accumulation operation synchronized to the second sequential order.

10. The memory circuit of claim 9, wherein
the input circuit further comprises:
a second data register configured to receive and output successive data elements of a second plurality of data elements responsive to the clock signal, wherein each data element of the second plurality of data elements comprises the total number of bits N; and a second selection circuit coupled to the second data register and configured to output the N bits of each data element of the second plurality of data elements in the first and second sequential orders responsive to the respective first and second sequences of the first selection signal, the memory circuit further comprises a second multiplier coupled to the second selection circuit and to the adder, the first and second multipliers are configured to output first and second product data elements by multiplying the successive data elements of the first and second pluralities of data elements with stored data elements, and the adder is configured to output successive partial sum data elements to the accumulator by adding the first and second product data elements and extending each partial sum data element with a first low logical level bit in an LSB direction and a second low logical level bit in an MSB direction.

11. The memory circuit of claim 10, wherein the accumulator comprises:

an adder circuit; and a third selection circuit coupled to the adder and configured to, responsive to the second selection signal:

propagate the successive partial sum data elements to the adder circuit by including the first low logical level bit and excluding the second low logical level bit during the first accumulation operation corresponding to the first sequential order being an LSB-to-MSB sequential order, and propagate the successive partial sum data elements to the adder circuit by excluding the first low logical level bit and including the second low logical level bit during the second accumulation operation corresponding to the second sequential order being an MSB-to-LSB sequential order.

12. The memory circuit of claim 11, wherein the accumulator further comprises:

a third data register configured to receive successive sum data elements from the adder circuit based on the propagated successive partial sum data elements;

a first shifter configured to perform a right shift operation on a signal output from the third data register;

a second shifter configured to perform a left shift operation on the signal output from the third data register; and a fourth selection circuit configured to, responsive to the second selection signal:

couple the first shifter between the third data register and the adder circuit during the first accumulation operation, and couple the second shifter between the third data register and the adder circuit during the second accumulation operation.

13. The memory circuit of claim 12, wherein the accumulator is configured to output the signal from the third data register to an output data bus.

14. The memory circuit of claim 9, wherein the signal generation portion of the input circuit comprises a second selection circuit configured to:

receive complementary signals based on the clock signal, and responsive to the second selection signal, output the complementary signals as the two alternating sequences of the first selection signal.

15. The memory circuit of claim 14, wherein the signal generation portion of the input circuit further comprises:

a first counter and an inverter configured to generate the complementary signals based on the clock signal; and a second counter configured to generate the second selection signal based on the clock signal.

16. A method of operating a memory circuit, the method comprising:

receiving first and second signals at an input circuit, each of the first and second signals comprising a plurality of N-bit data elements;

generating a first selection signal comprising two alternating sequences in which values of the first sequence increment from zero to N−1 and values of the second sequence decrement from N−1 to zero;

in response to the first selection signal, outputting the N bits of successive data elements of the first and second signals from the input circuit to first and second multipliers in alternating sequential orders;

using the first and second multipliers to output first and second product data elements by multiplying the successive data elements of the first and second signals with stored data elements;

using an adder to output successive partial sum data elements by adding the first and second product data elements; and using an accumulator to perform a first accumulation operation synchronized to the first sequential order and a second accumulation operation synchronized to the second sequential order.

17. The method of claim 16, wherein the generating the first selection signal comprises selecting complementary signals corresponding to the two alternating sequences in response to a second selection signal, and the using the accumulator to perform the first and second accumulation operations is in response to the second selection signal.

18. The method of claim 16, wherein the using the adder to output the successive partial sum data elements further comprises extending each partial sum data element with a first low logical level bit in an LSB direction and a second low logical level bit in an MSB direction.

19. The method of claim 18, wherein the using the accumulator to perform the first accumulation operation comprises including the first low logical level bit and excluding the second low logical level bit of each partial sum data element corresponding to a first sequential order of the alternating sequential orders being an LSB-to-MSB sequential order, and the using the accumulator to perform the second accumulation operation comprises excluding the first low logical level bit and including the second low logical level bit of each partial sum data element corresponding to a second sequential order of the alternating sequential orders being an MSB-to-LSB sequential order.

20. The method of claim 19, wherein the using the accumulator to perform the first accumulation operation further comprises feeding an output signal back to an adder circuit by performing a right shift operation, and the using the accumulator to perform the second accumulation operation further comprises feeding the output signal back to the adder circuit by performing a left shift operation.

* * * * *